United States Patent
Hsiao et al.

(10) Patent No.: US 10,951,154 B2
(45) Date of Patent: Mar. 16, 2021

(54) MOTOR DRIVING CIRCUIT AND CONTROL METHOD THEREOF

(71) Applicant: DELTA ELECTRONICS, INC., Taoyuan (TW)

(72) Inventors: Chih-Hung Hsiao, Taoyuan (TW); Chia-Pin Wei, Taoyuan (TW); Yu-Wei Lee, Taoyuan (TW); Wei-Shuo Tseng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/409,863

(22) Filed: May 12, 2019

(65) Prior Publication Data

US 2019/0356262 A1 Nov. 21, 2019

(30) Foreign Application Priority Data

May 16, 2018 (CN) .......................... 201810469099.8

(51) Int. Cl.
*H02P 27/14* (2006.01)
*H02P 21/22* (2016.01)
*H02P 23/00* (2016.01)
*H02M 7/5387* (2007.01)

(52) U.S. Cl.
CPC ........ *H02P 27/14* (2013.01); *H02M 7/53875* (2013.01); *H02P 21/22* (2016.02); *H02P 23/0004* (2013.01)

(58) Field of Classification Search
CPC ...... H02P 27/14; H02P 21/22; H02P 23/0004; H02P 27/08; H02P 6/16; H02P 23/28; H02M 7/53875
See application file for complete search history.

(56) References Cited

U.S. PATENT DOCUMENTS

| | | | |
|---|---|---|---|
| 5,552,977 A | 9/1996 | Xu et al. | |
| 7,531,974 B2 | 5/2009 | Ohtsuka et al. | |
| 9,419,549 B2 | 8/2016 | Yim et al. | |
| 2004/0232875 A1* | 11/2004 | Youm | H02M 7/53871 318/801 |
| 2008/0297087 A1* | 12/2008 | Ohtsuka | B60L 50/15 318/465 |
| 2011/0181231 A1* | 7/2011 | Ito | B60L 50/51 318/801 |
| 2011/0241583 A1* | 10/2011 | He | H02P 21/0021 318/400.09 |
| 2016/0308475 A1* | 10/2016 | Morii | H02P 21/02 |

FOREIGN PATENT DOCUMENTS

| | | | |
|---|---|---|---|
| CN | 103684129 A | | 3/2014 |
| JP | 2009171640 A | * | 7/2009 |
| JP | 2011015568 A | * | 1/2011 |
| TW | I504136 B | | 10/2015 |

* cited by examiner

*Primary Examiner* — Bickey Dhakal
(74) *Attorney, Agent, or Firm* — CKC & Partners Co., LLC

(57) ABSTRACT

A motor driving circuit including a first and a second driving signal output circuit is configured to selectively output a six-step square wave driving signal from the first driving signal output circuit, or a space-vector driving signal from the second driving signal output circuit to an inverter to drive a motor according to whether an operating power exceeds a power threshold. The first driving signal output circuit is configured to generate the six-step square wave driving signal. The second driving signal output circuit is configured to generate the space-vector driving signal.

16 Claims, 8 Drawing Sheets

MOTOR DRIVING CIRCUIT AND CONTROL METHOD THEREOF

RELATED APPLICATIONS

This application claims priority to China Application Serial Number 201810469099.8, filed May 16, 2018, which is herein incorporated by reference.

BACKGROUND

Technical Field

The disclosure relates to a driving circuit and a control method thereof, and particularly to a motor driving circuit and a control method thereof.

Description of Related Art

With the development of technology of power electronics, motor driving circuits are widely applied to various fields of electronic motors.

In general, the motor driving method is divided into a space-vector pulse width modulation (SVPWM) and a six-step square wave mode. The control methods of these two modes are different with advantages and disadvantages.

Therefore, how to design a new motor driving circuit to take into account the advantages of both is a problem that needs to be solved in this industry.

SUMMARY

One aspect of the present disclosure is a motor driving circuit including a voltage signal generating unit, a first voltage signal converter and a first driving signal generator. The voltage signal generating unit is electrically coupled to a motor and configured to receive a motor position signal and a three phase current signal of the motor, and is to output a set of d-q axis voltage signal and a motor electric angle according to the motor position signal, the three phase current signal and a current command. The first voltage signal converter is configured to output a phase shift command and an amplitude command according to the set of d-q axis voltage signal. The first driving signal generator is configured to output a control signal to an inverter to drive the motor according to the phase shift command, the amplitude command and the motor electric angle.

Another aspect of the present disclosure is a motor driving circuit including a first driving signal output circuit and a second driving signal output circuit. The first driving signal output circuit is configured to generate a six-step square wave driving signal. The second driving signal output circuit is configured to generate the space-vector driving signal. The motor driving circuit is configured to selectively output the six-step square wave driving signal from the first driving signal output circuit or output the space-vector driving signal from the second driving signal output circuit to an inverter to drive the motor according to whether an operating power exceeds a power threshold.

Yet another aspect of the present disclosure is a motor driving circuit control method including outputting a six-step square wave driving signal by a first driving signal output circuit; outputting a space-vector driving signal by a second driving signal output circuit; detecting whether an operating power of a motor exceeds a power threshold by a motor driving circuit; outputting the six-step square wave driving signal to an inverter to drive the motor by the motor driving circuit on the condition that the operating power exceeds the power threshold; and outputting the space-vector driving signal to the inverter to drive the motor by the motor driving circuit on the condition that the operating power does not exceed the power threshold.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

Figure 1:
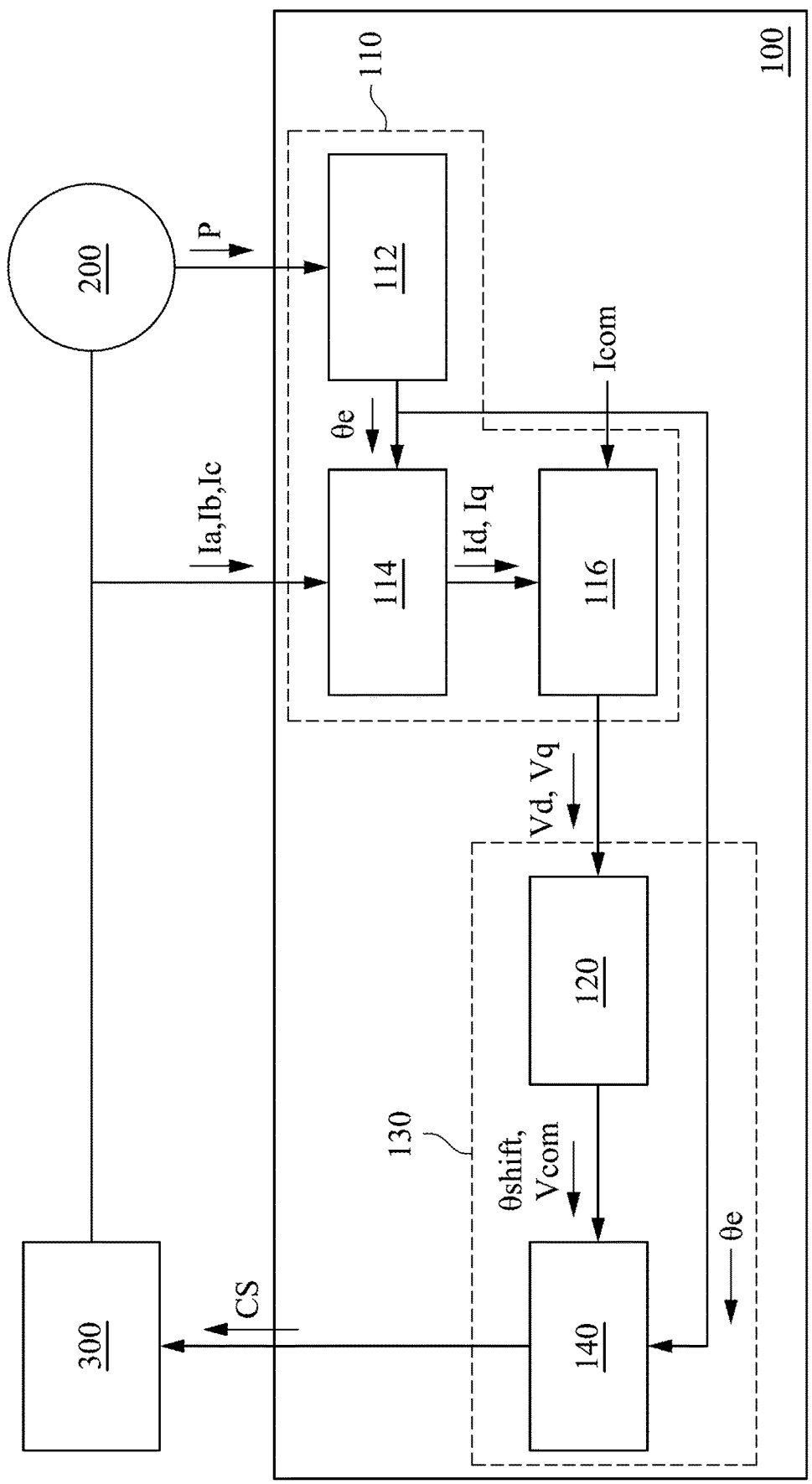
FIG. 1 is a schematic diagram illustrating a motor driving circuit in accordance with some embodiments of the disclosure.

Please refer to FIG. 1. FIG. 1 is a schematic diagram illustrating a motor driving circuit 100 in accordance with some embodiments of the present disclosure. As shown in FIG. 1, the motor driving circuit 100 is electrically coupled to a motor 200 and an inverter 300, and configured to output control signal CS of control power switches to the inverter 300 to drive the motor 200 according to a motor position signal P and three phase signals Ia, Ib, and Ic received from the motor 200. For example, the motor driving circuit 100 may be realized by a central processing unit (CPU), a microcontroller unit (MCU), a complex programmable logic device (CPLD), or a field-programmable gate array (FPGA).

As shown in FIG. 1, the motor driving circuit 100 includes a voltage signal generating unit 110 and a first driving signal output circuit 130. The first driving signal output circuit 130 includes a first voltage signal converter 120 and a first driving signal generator 140. The first driving signal output circuit 130 is configured to generate a six-step square wave driving signal to regard as a control signal CS according to the motor electric angle θe and d-q axis voltage signals Vd and Vq corresponding to the motor 200. In structure, the voltage signal generating unit 110 is electrically coupled to the motor 200 and the first driving signal output circuit 130. The first voltage signal converter 120 is electrically coupled to the first driving signal generator 140. The first driving signal generator 140 is electrically coupled to the inverter 300.

In some embodiments, the voltage signal generating unit 110 includes an electric angle calculator 112, a current signal converter 114 and a PI controller 116. In structure, the electric angle calculator 112 is electrically coupled to the motor 200, the current signal converter 114 and the first driving signal generator 140. The current signal converter 114 is electrically coupled to the motor 200 and the PI controller 116. The PI controller 116 is electrically coupled to the first voltage signal converter 120. For the convenience of explanation, the specific operation of each unit in the motor driving circuit 100 will be disclosed with accompanying schematic diagrams for detailed description in the following paragraphs.

As shown in FIG. 1, the electric angle calculator 112 is configured to receive the motor position signal P of the motor 200, and to output the motor electric angle θe to the current signal converter 114 and the first driving signal generator 140 according to the motor position signal P.

Figure 2:
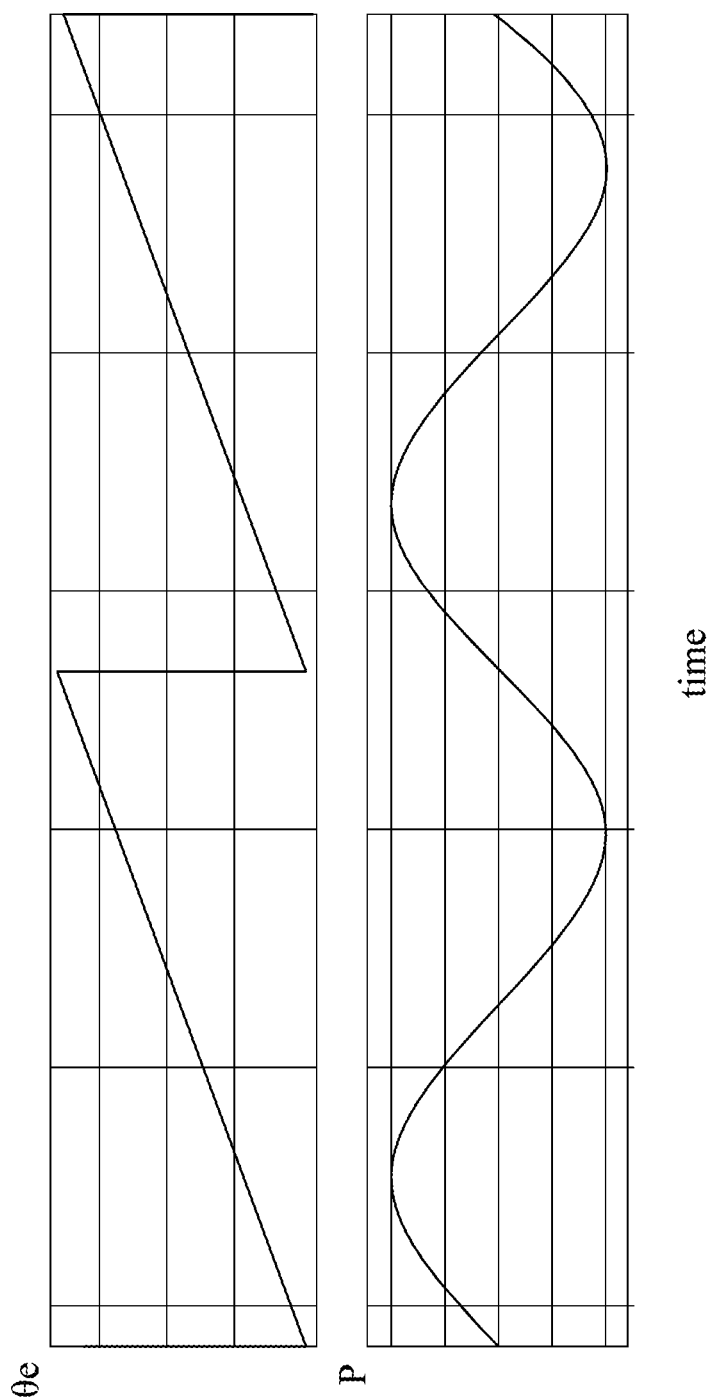
FIG. 2 is a schematic diagram illustrating waves of motor position signal and motor electric angle in accordance with some embodiments of the disclosure.

Specifically, please refer to FIG. 2. FIG. 2 is a schematic diagram illustrating waves of the motor position signal P and the motor electric angle θe in accordance with some embodiments of the present disclosure. The wave in the lower part of diagram represents the motor position signal P with the opposite electromotive force of a-phase (i.e., the voltage from the a-phase to the motor three-phase neutral point.) in the three phase of the motor 200. The wave in the upper part of the diagram is the motor electric angle θe converted according to the motor position signal P by the electric angle calculator 112. As shown in FIG. 2, the motor electric angle θe is cycled from 0 to 360 degree as one cycle and changes synchronously with the motor position signal P.

As shown in FIG. 1, the current signal converter 114 is configured to receive the three phase current signals Ia, Ib, and Ic of the motor 200, and to convert the three phase current signals Ia, Ib, and Ic into a set of d-q axis current signals Id and Iq according to the motor electric angle θe, and to output the set of d-q axis current signals Id and Iq to the PI controller 116.

Specifically, the current signal converter 114 extracts the three phase current signals Ia, Ib, and Ic by the power element or directly from the motor three wires, and converts the three phase current signals Ia, Ib, and Ic into the set of d-q axis current signals Id and Iq according to the following formula:

$$\begin{bmatrix} I_d \\ I_q \\ I_o \end{bmatrix} = \frac{2}{3} \cdot \begin{bmatrix} \cos\theta_e & \cos\left(\theta_e - \frac{2\pi}{3}\right) & \cos\left(\theta_e + \frac{2\pi}{3}\right) \\ \sin\theta_e & \sin\left(\theta_e - \frac{2\pi}{3}\right) & \sin\left(\theta_e + \frac{2\pi}{3}\right) \\ \frac{1}{2} & \frac{1}{2} & \frac{1}{2} \end{bmatrix} \cdot \begin{bmatrix} I_a \\ I_b \\ I_c \end{bmatrix}$$

$I_o$ is the current of the three phase neutral point of the motor 200. Assuming the three phase balance, $I_o$ is approximately equal to 0. It should be noted that the formula above is used as an example not intended to limit the disclosure. Those of ordinary skilled in the art should understand that any operation that converts the three phase current signals Ia, Ib, and Ic (three-phase rotation coordinates) into the d-q axis current signals Id and Iq (two-phase stationary coordinates) is covered by the disclosure.

Then, the current signal converter 114 outputs the d-q axis current signals Id, and Iq to the PI controller 116. As shown in FIG. 1, PI controller 116 is configured to output a set of d-q axis voltage signals Vd and Vq to the first voltage signal converter 120 according to the d-q axis current signals Id and Iq and a current command Icom.

Specifically, the current command Icom includes a d-axis current command Id_com and a q-axis current command Id_com. The PI controller 116 outputs a d-axis voltage signal Vd according to the d-axis current signal Id and the d-axis current command Id_com, and outputs a q-axis voltage signal Vq according to the q-axis current signal Iq and the q-axis current command Id_com.

In this way, the voltage signal generating unit 110 receives the motor position signal P of motor 200 and the three phase current signals Ia, Ib, and Ic, and outputs the d-q axis voltage signals Vd and Vq to the first voltage signal converter 120 according to the motor position signal P, the three phase current signals Ia, Ib, and Ic and the current command Icom.

Please keep referring to FIG. 1. The first voltage signal converter 120 is configured to output a phase shift command θshift and an amplitude command Vcom according to the d-q axis voltage signals Vd and Vq. Specifically, in some embodiments, the first voltage signal converter 120 regards the q-axis voltage signal Vq as the amplitude command Vcom, and multiplies the d-axis voltage signal Vd by a proportion K to regard as the phase shift command θshift, in which the proportion K may be any real number.

Furthermore, in order to prevent the d-axis voltage signal Vd from having larger ripple fluctuations, in some embodiments, the first voltage signal converter 120 is configured to reduce the PI control responses of the d-axis voltage signal Vd, and then multiply the d-axis voltage signal Vd by the proportion K to regard as the phase shift command θshift. In some other embodiments, the first voltage signal converter 120 is configured to low-pass filter the d-axis voltage signal Vd, and then to multiply the d-axis voltage signal Vd by the proportion K to regard as the phase shift command θshift. For example, the first voltage signal converter 120 may include a low-pass filter and a P controller to realize the operations above.

Accordingly, the first voltage signal converter 120 converts the d-q axis voltage signals Vd and Vq outputted based on the current feedback into the phase shift command θshift and the amplitude command Vcom required for six-step square wave driving mode.

Please keep referring to FIG. 1. The first voltage signal converter 120 outputs the phase shift command θshift and the amplitude command Vcom to the first driving signal generator 140. The first driving signal generator 140 is configured to output a control signal CS to the inverter 300 to drive the motor 200 according to the phase shift command θshift, the amplitude command Vcom and the motor electric angle θe.

Figure 3:
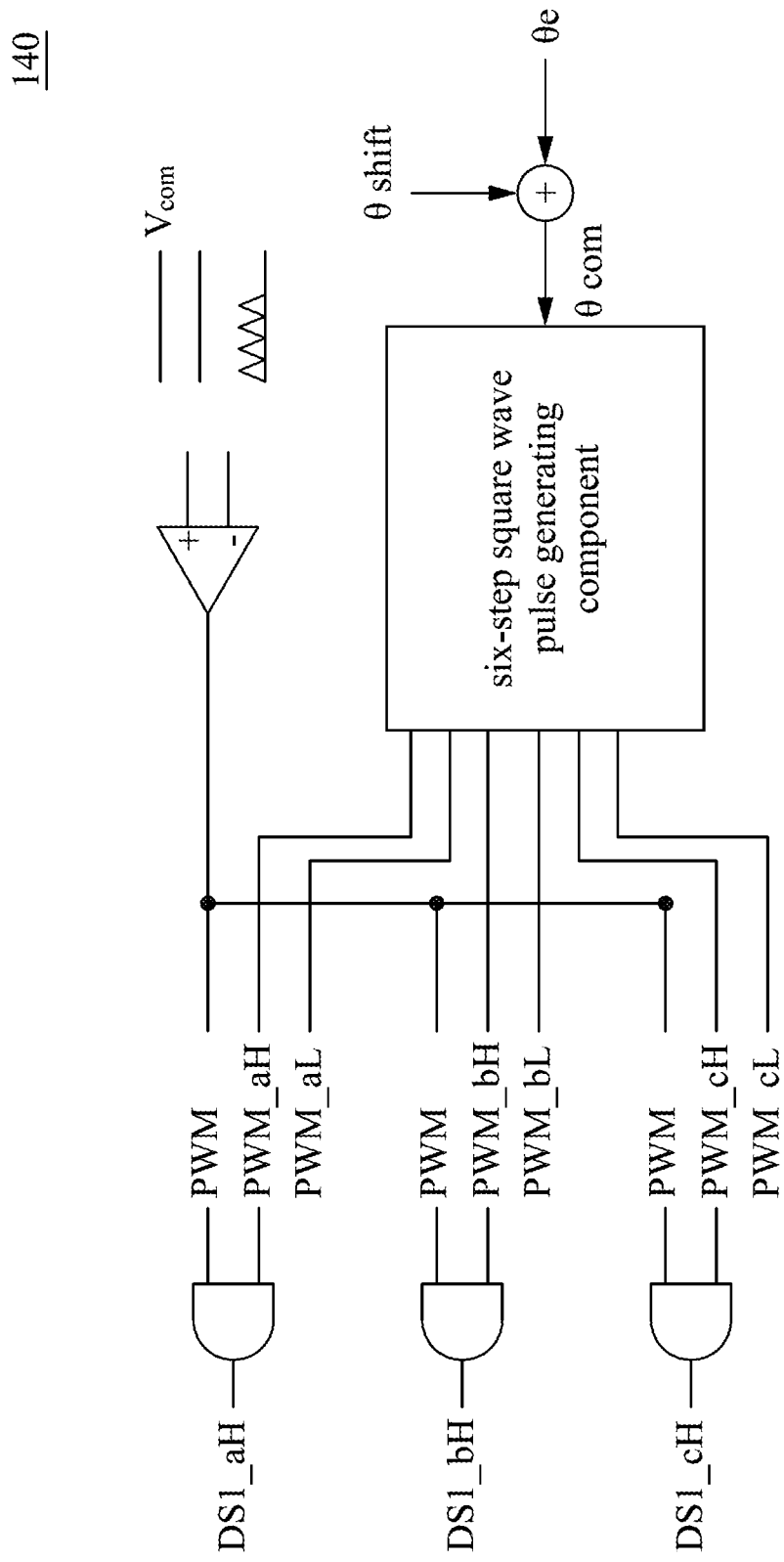
FIG. 3 is a schematic diagram illustrating of a driving signal generator in accordance with some embodiments of the disclosure.

Specifically, the control signal CS may be a six-step square wave driving signal including power switch signals corresponding to three-phase six-arm of the inverter 300. As shown in FIG. 3, the first driving signal generator 140 sums up the phase shift command θshift and the motor electric angle θe to regard as an angle command θcom, and generates square wave pulse signals PWM_aH, PWM_bH, PWM_cH, PWM_aL, PWM_bL, and PWM_cL of upper arms and lower arms via a six-step square wave pulse generating component according to the angle command θcom. In addition, the first driving signal generator 140 generates the square wave pulse signal PWM according to the amplitude command Vcom and the triangle wave via the comparators. Then, performing AND logic operation to obtain power switching signals DS1_aH, DS1_bH, and DS1_cH of the switching power switches of the upper arms in the three-phase six-arm of the inverter 300 according to the square wave signals PWM_aH, PWM_bH, and PWM_cH of the upper arms and the square wave signal PWM via AND gates, respectively. In addition, the square wave signals PWM_aL, PWM_bL, and PWM_cL of lower arms are regarded as the power switching signals DS1_aL, DS1_bL, and DS1_cL of switching power switches of the lower arms in the three-phase six-arm of the inverter 300, respectively.

In some other embodiments, the first driving signal generator 140 may also perform AND logic operation to obtain power switching signals DS1_aL, DS1_bL, and DS1_cL of the switching power switches of the lower arms in the three-phase six-arm of the inverter 300 according to the square wave signals PWM_aL, PWM_bL, and PWM_cL of the lower arms and the square wave signal PWM via AND gates, respectively. In addition, the square wave signals PWM_aH, PWM_bH, and PWM_cH of the upper arms are regarded as the power switching signals DS1_aH, DS1_bH, and DS1_cH of switching power switches of the lower arms in the three-phase six-arm of the inverter 300, respectively. Then, the motor driving circuit 100 regards the six-step square wave driving signals as the control signals CS of controlling the power switches and outputs the control signals CS to the inverter 300 to drive the motor 200.

Figure 4A:
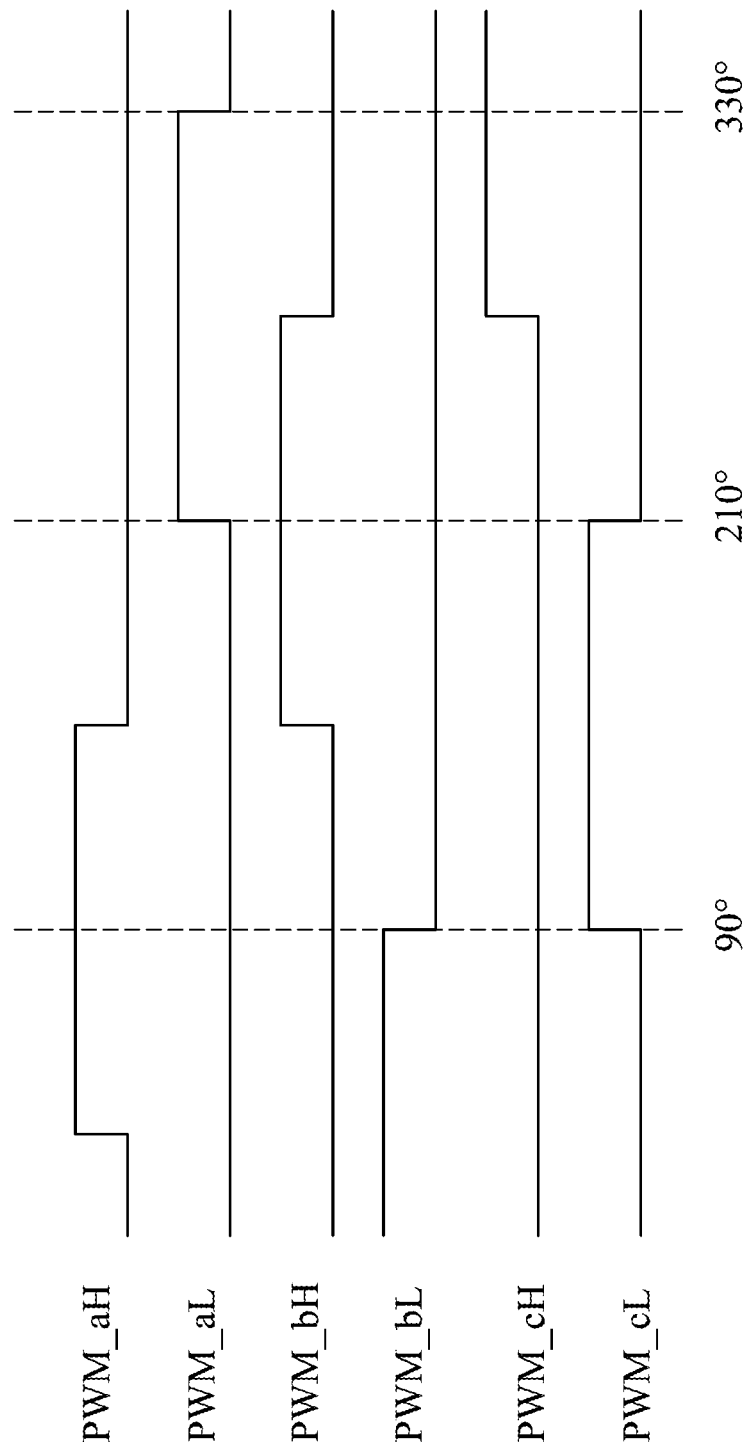
FIGS. 4A and 4B are schematic diagrams illustrating of waves of signals in accordance with some embodiments of the disclosure.
Figure 4B:
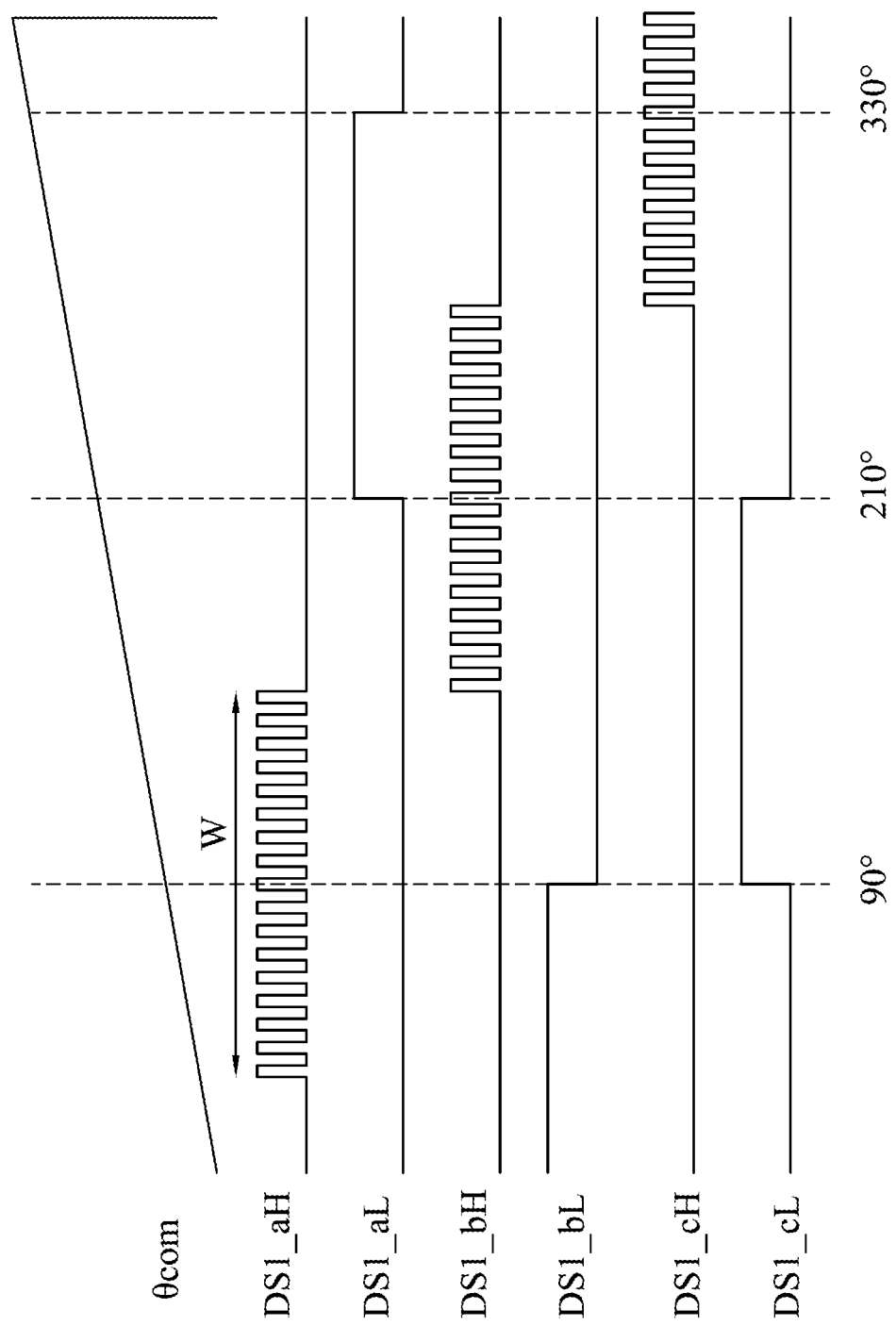

For example, as shown in FIG. 4A, the waves from the upper part to the lower part of diagrams are square wave pulse signals PWM_aH, PWM_bH, PWM_cH, PWM_aL, PWM_bL, and PWM_cL of the upper arms and the lower arms generated by the six-step square wave pulse generating component. As shown in FIG. 4B, the uppermost wave is the angle command θcom. The other waves from the upper part to the lower part of the diagram are power switching signals DS1_aH, DS1_aL, DS1_bH, DS1_bL, DS1_cH, and DS1_cL of the upper arm of a-phase, the lower arm of a-phase, the upper arm of b-phase, the lower arm of b-phase, the upper arm of c-phase, and the lower arm of c-phase of the inverter 300, respectively. In the present embodiment, a 120 degree six-step square wave is taken as an example. Therefore, the width W of each signal extending on both sides of the center point is 120 degree, but it is not intended to limit the present disclosure. In some other embodiments, the width may be 90 degree or 180 degree.

In this way, the motor driving circuit 100 is able to achieve the effect that the six-step square wave driving signal DS1 may make the current phase and the counter electromotive force phase of the motor 200 approach the space vector pulse driving mode to improve the control of the motor 200 with the characteristics that based on the d-axis voltage signal Vd to control the phase shifting and based on the q-axis voltage signal Vq to control the amplitude.

Figure 5:
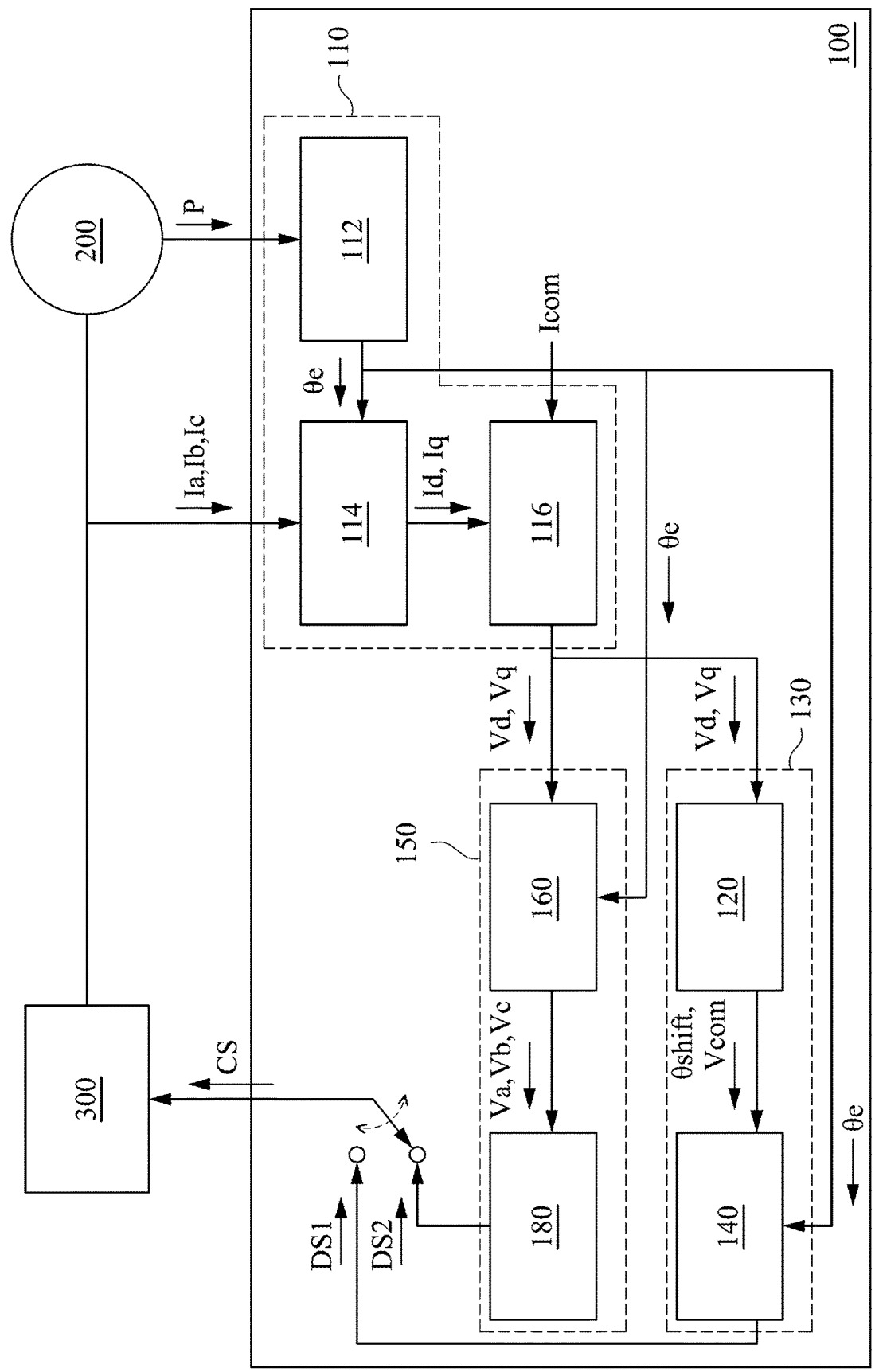
FIG. 5 is a schematic diagram illustrating of another motor driving circuit in accordance with some other embodiments of the disclosure.

Please refer to FIG. 5. FIG. 5 is a schematic diagram illustrating of another motor driving circuit 100 in accordance with some other embodiments of the disclosure. In the embodiments shown in FIG. 5, similar elements related to the embodiments in FIG. 1 are represented by the same reference symbols for ease of understanding, and the similar structures and/or operations are described above, and thus further explanation is omitted. In contract to the embodiments in FIG. 1, the present embodiment, the motor driving circuit 100 further includes a second driving signal output circuit 150. The second driving signal output circuit 150 includes a second voltage signal converter 160 and a second driving signal generator 180, and is configured to generate a space-vector driving signal according to the d-q axis voltage signal and the motor electric angle.

In structure, the second driving signal output circuit 150 is electrically coupled to the voltage signal generating unit 110 and the inverter 300. The second voltage signal converter 160 is electrically coupled to the second driving signal generator 180, the electric angle calculator 112 and the PI controller 116 in the voltage signal generating unit 110. The second driving signal generator 180 is electrically coupled to the second voltage signal converter 160 and the inverter 300. In operation, the second voltage signal converter 160 is configured to convert the d-q axis voltage signals Vd and Vq into the three phase voltage signals Va, Vb, and Vc according to the motor electric angle θe. The second driving signal generator 180 is configured to output the space-vector driving signal DS2 according to the three phase voltage signals Va, Vb, and Vc.

In this way, the motor driving circuit 100 may be configured to selectively output the six-step square wave driving signal DS1 by the first driving signal generator 140 or output the space-vector driving signal DS2 by the second driving signal generator 180 regarded as the control signal CS to the inverter 300 to drive the motor 200 according to whether the operating power of the motor 200 exceeds the power threshold. The method for selection, for example, may be by switching the output signal between the first driving signal output circuit 130, the second driving signal output circuit 150 and the inverter 300.

Specifically, the second voltage signal converter 160 converts the d-q axis voltage signals Vd and Vq into the three phase voltage signals Va, Vb, and Vc according to the following formula:

$$\begin{bmatrix} V_a \\ V_b \\ V_c \end{bmatrix} = \begin{bmatrix} \cos\theta_e & \sin\theta_e & \frac{1}{2} \\ \cos\left(\theta_e - \frac{2\pi}{3}\right) & \sin\left(\theta_e - \frac{2\pi}{3}\right) & \frac{1}{2} \\ \cos\left(\theta_e + \frac{2\pi}{3}\right) & \sin\left(\theta_e + \frac{2\pi}{3}\right) & \frac{1}{2} \end{bmatrix} \cdot \begin{bmatrix} V_d \\ V_q \\ V_o \end{bmatrix}$$

$V_o$ is the voltage of the three phase neutral point of the motor 200. Assuming the three phase balance, $V_o$ is approximately equal to 0. It should be noted that the formula above is used as an example not intended to limit the disclosure. Those of ordinary skilled in the art should understand that any operation that converts the three phase voltage signals Va, Vb, and Vc (three-phase rotation coordinates) into the d-q axis voltage signals Vd and Vq (two-phase stationary coordinates) is covered by the disclosure.

Then, the second voltage signal converter 160 outputs the three phase voltage signals Va, Vb, and Vc to the second driving signal generator 180.

Figure 6:
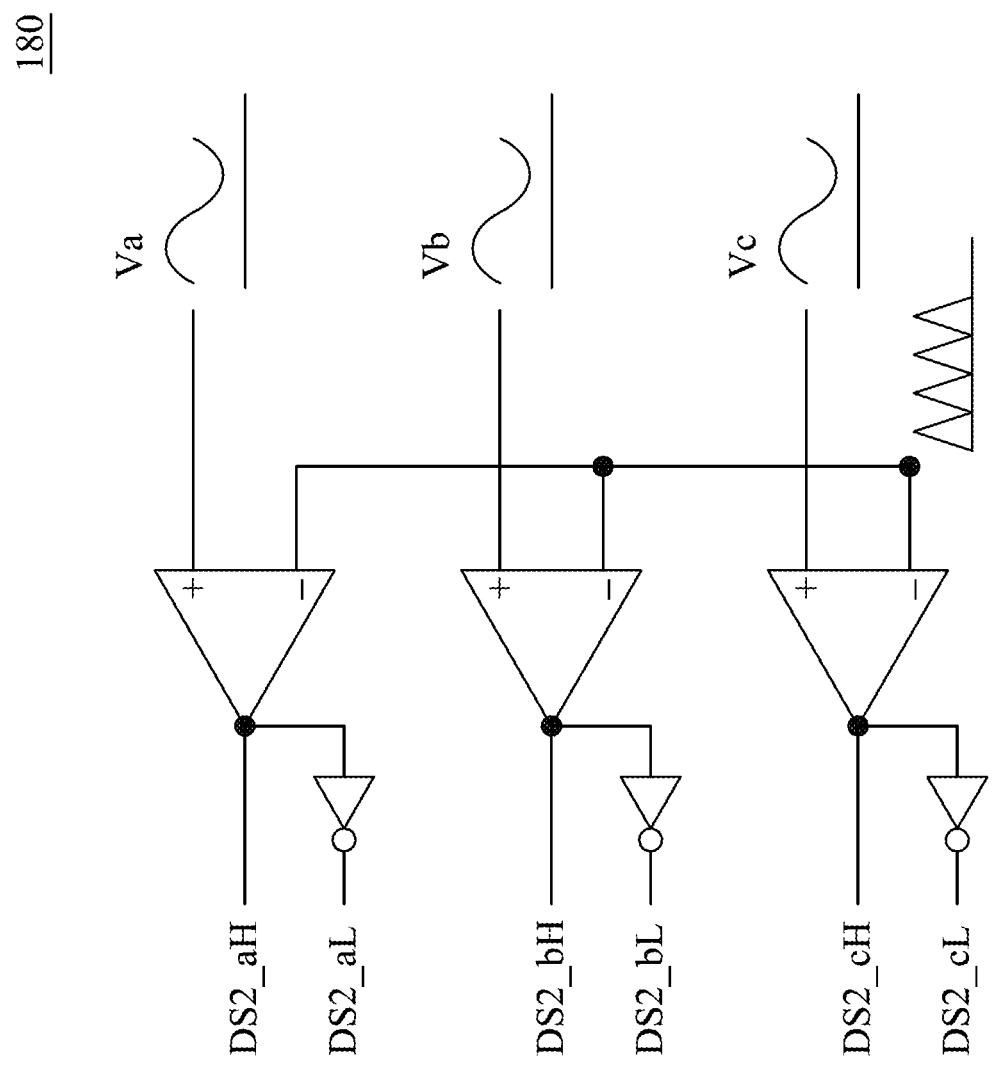
FIG. 6 is a schematic diagram illustrating of another driving signal generator in accordance with some other embodiments of the disclosure.

Please refer to FIG. 6 together with FIG. 5. FIG. 6 is a schematic diagram illustrating of the second driving signal generator 180 in accordance with some other embodiments of the disclosure. Specifically, the space-vector driving signal DS2 includes the power switching signals of the upper arms DS2_aH, DS2_bH, DS2_cH and the complementary power switching signals of the lower arms DS2_aL, DS2_bL, DS2_cL represented a-phase, b-phase and c-phase, respectively. As shown in FIG. 6, the second driving signal generator 180 generates the power switching signals of the upper arms DS2_aH, DS2_bH, and DS2_cH according to the three phase voltage signals Va, Vb, and Vc comparing with the triangular wave via the comparators, and generates the power switching signals of the lower arms DS2_aL, DS2_bL, and DS2_cL corresponding complementary to the upper arm signals by the reversers.

In this way, the motor driving circuit 100 may be able to convert the d-q axis voltage signals Vd and Vq into the three phase voltage signals Va, Vb, and Vc based on axis conversion formula to generate the space-vector driving signal DS2 as the control signal CS, and output the control signal CS to the inverter 300 to drive the motor 200.

As described above, the motor driving circuit 100 may selectively output the six-step square wave driving signal DS1 or the space-vector driving signal to the inverter 300 to drive the motor 200 according to whether the operating power exceeds the motor 200. In some embodiments, the motor driving circuit 100 is further configured to selectively output the six-step square wave driving signal DS1 or the space-vector driving signal DS2 to the inverter 300 to drive the motor 200 according to whether a motor temperature exceeds a first temperature threshold, or whether a motor noise exceeds a noise threshold. In some other embodiments, the motor driving circuit 100 is further configured to selectively output the six-step square wave driving signal DS1 or the space-vector driving signal DS2 to the inverter 300 to drive the motor 200 according to whether an inverter power component temperature exceeds a second temperature threshold.

Specifically, in some embodiments, the motor driving circuit 100 selectively outputs the six-step square wave driving signal DS1 on the condition that the operating power of the motor 200 exceeds the power threshold, the motor temperature exceeds the first temperature threshold, the inverter power component temperature exceeds the second temperature threshold or the motor noise exceeds the noise threshold. On the contrary, the motor driving circuit 100 selectively outputs the space-vector driving signal DS2 on the condition that the operating power of the motor 200 does not exceed the power threshold, the motor temperature does not exceed the first temperature threshold, the inverter power component temperature does not exceed the second temperature threshold or the motor noise does not exceed the noise threshold.

In this way, the space-vector pulse driving mode may be used when the operating power is small, so that the noise is reduced, and the motor coil magnetic field is orthogonal to the magnetic field of the magnet and the maximum torque is generated in a unit current. On the other hand, when the operating power is high or in high temperature, a six-step square wave driving mode is used to reduce the switching loss and reduce the waste heat generated.

Figure 7:
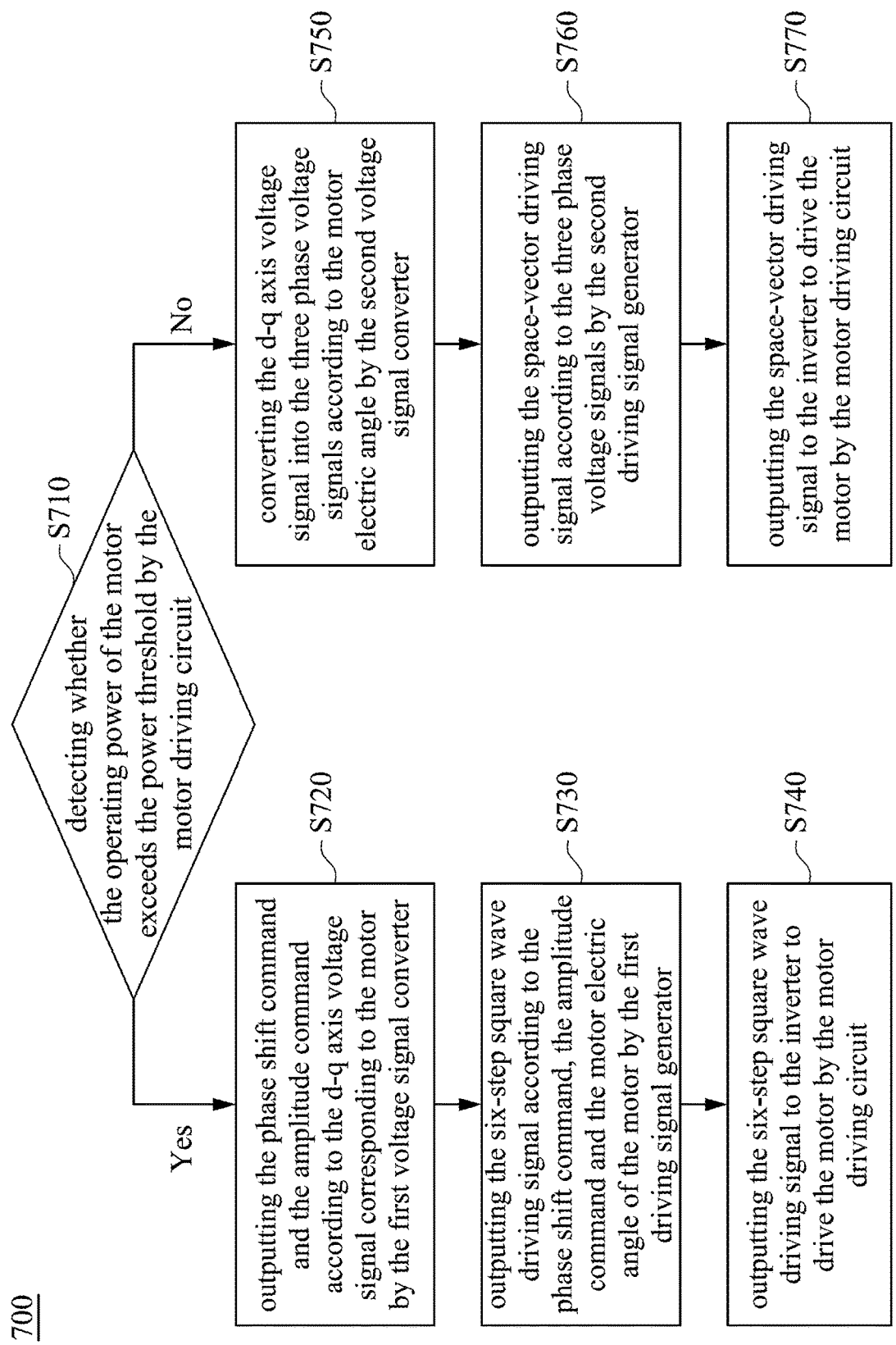
FIG. 7 is a flowchart of a motor driving circuit control method illustrated in accordance with some embodiments of the disclosure.

Please refer to FIG. 7. FIG. 7 is a flowchart of a motor driving circuit control method 700 illustrated in accordance with some embodiments of the disclosure. For the convenience and clarity of explanation, the following motor driving circuit control method 700 is described in accompanying with the embodiments shown in FIGS. 1-7, but not limited thereto. Various alterations and modifications may be performed on the disclosure by those of ordinary skilled in the art without departing from the principle and spirit of the disclosure. As shown in FIG. 7, the motor driving circuit control method 700 includes operations S710, S720, S730, S740, S750, S760 and S770.

Firstly, in the operation S710, detecting whether the operating power of the motor 200 exceeds the power threshold by the motor driving circuit 100.

On the condition that the operating power of the motor 200 exceeds the power threshold, the operations S720, S730 and S740 are executed. In the operation S720, outputting the phase shift command θshift and the amplitude command Vcom according to the d-q axis voltage signals Vd and Vq corresponding to the motor 200 by the first voltage signal converter 120.

Then, in the operation S730, outputting the six-step square wave driving signal DS1 according to the phase shift command θshift, the amplitude command Vcom and the motor electric angle θe of the motor 200 by the first driving signal generator 140.

In other words, in the operations S720 and S730, outputting the six-step square wave driving signal DS1 according to the d-q axis voltage signals Vd and Vq corresponding to the motor 200 and the motor electric angle θe by the first driving signal output circuit 130.

Then, in the operation S740, outputting the six-step square wave driving signal DS1 to the inverter 300 to drive the motor 200 by the motor driving circuit 100.

On the condition that the operating power of the motor 200 does not exceed the power threshold, the operations S750, S760 and S770 are executed. In the operation S750, converting the d-q axis voltage signals Vd and Vq into the three phase voltage signals Va, Vb, and Vc according to the motor electric angle θe by the second voltage signal converter 160.

Then, in the operation S760, outputting the space-vector driving signal DS2 according to the three phase voltage signals Va, Vb, and Vc by the second driving signal generator 180.

In other words, in the operations S750 and S760, outputting the space-vector driving signal DS2 according to the d-q axis voltage signals Vd and Vq and the motor electric angle θe by the second driving signal output circuit 150.

Then, in the operation S770, outputting the space-vector driving signal DS2 to the inverter 300 to drive the motor 200 by the motor driving circuit 100.

In the foregoing, exemplary operations are included. However, these operations do not need to be performed sequentially. The operations mentioned in the embodiment may be adjusted according to actual needs unless the order is specifically stated, and may even be performed simultaneously or partially simultaneously.

Furthermore, each of the above embodiments may be implemented by various types of digital or analog circuits or by different integrated circuit chips. Individual components may also be integrated into a single control chip. Various control circuits may also be implemented by various processors or other integrated circuit chips. The above is only an example, and it should not limit the present disclosure.

In summary, in various embodiments, the motor driving circuit 100 selectively outputs the six-step square wave driving signal DS1 or the space-vector driving signal DS2 according to whether the operating power of the motor 200, the motor temperature, the inverter power component temperature or the motor noise exceeds the threshold so that the motor 200 could be switched to the space-vector pulse width modulation mode when the motor is at low speed or low noise, and be switched to the six-step square wave mode when the motor is at high speed or the switching components heat up. Accordingly, when the operating power is small, the space vector pulse driving mode is used to make noise reduction and generate the maximum torque. When the operating power is high or at high temperature, the six-step square wave driving mode is used to reduce switching loss and waste heat.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A motor driving circuit, comprising:
a voltage signal generating unit, electrically coupled to a motor, configured to receive a motor position signal of the motor and three phase current signals of the motor and output a set of d-q axis voltage signal and a motor electric angle according to the motor position signal, the three phase current signals and a current command;
a first voltage signal converter, configured to output a phase shift command and an amplitude command according to the set of d-q axis voltage signal; and
a first driving signal generator, configured to sum up the phase shift command and the motor electric angle to regard as an angle command and configured to output a control signal to an inverter to drive the motor according to the amplitude command and the angle command, wherein the control signal is a six-step square wave.

2. The motor driving circuit of claim 1, wherein the set of d-q axis voltage signal comprises a d-axis voltage signal, the first voltage signal converter is further configured to multiply the d-axis voltage signal by a proportion to regard as the phase shift command.

3. The motor driving circuit of claim 2, wherein the first voltage signal converter is configured to reduce PI control response of the d-axis voltage signal, or perform low-pass filtering of the d-axis voltage signal.

4. The motor driving circuit of claim 1, wherein the voltage signal generating unit comprises an electric angle calculator electrically coupled to the motor and configured to receive the motor position signal and output the motor electric angle according to the motor position signal.

5. The motor driving circuit of claim 1, wherein the voltage signal generating unit comprises a current signal converter, electrically coupled to the motor, and configured to receive the three phase current signals and converts the three phase current signal into a set of d-q axis current signal according to the motor electric angle.

6. The motor driving circuit of claim 1, wherein the voltage signal generating unit comprises a PI controller, electrically coupled to the first voltage signal converter, and configured to output the set of d-q axis voltage signal to the first voltage signal converter according to a set of d-q axis current signal and the current command.

7. A motor driving circuit, comprising:
a first driving signal output circuit, configured to generate a six-step square wave driving signal; and
a second driving signal output circuit, configured to generate a space-vector driving signal,
wherein the motor driving circuit is configured to selectively output the six-step square wave driving signal from the first driving signal output circuit or output the space-vector driving signal from the second driving signal output circuit to an inverter to drive a motor according to whether an operating power of the motor exceeds a power threshold;
wherein the first driving signal output circuit comprises:
a first voltage signal converter, configured to output a phase shift command and an amplitude command according to a set of d-q axis voltage signal corresponding to the motor; and
a first driving signal generator, electrically coupled to the first voltage signal converter, and configured to output the six-step square wave driving signal according to the phase shift command, the amplitude command and a motor electric angle corresponding to the motor,
wherein the second driving signal output circuit comprises:
a second voltage signal converter, configured to convert the set of d-q axis voltage signal into a three phase voltage signal according to the motor electric angle; and
a second driving signal generator, electrically coupled to the second voltage signal converter, and configured to output the space-vector driving signal according to the three phase voltage signal;
wherein the first driving signal generator is further configured to sum up the phase shift command and the motor electric angle to regard as an angle command and generate the six-step square wave driving signal according to the angle command.

8. The motor driving circuit of claim 7, wherein the set of d-q axis voltage signal comprises a d-axis voltage signal, and the first voltage signal converter is further configured to multiply the d-axis voltage signal by a proportion to regard as the phase shift command.

9. The motor driving circuit of claim 8, wherein the first voltage signal converter is further configured to reduce PI control responses of the d-axis voltage signal, or perform low-pass filtering of the d-axis voltage signal.

10. The motor driving circuit of claim 7, further comprising:
an electric angle calculator, electrically coupled to the motor, and configured to receive a motor position signal and output the motor electric angle according to the motor position signal.

11. The motor driving circuit of claim 7, further comprising:
a current signal converter, electrically coupled to the motor, and configured to receive three phase current signals and convert the three phase current signals into a set of d-q axis current signal according the motor electric angle.

12. The motor driving circuit of claim 7, further comprising:
a PI controller, electrically coupled to the first driving signal output circuit and the second driving signal output circuit, configured to receive a set of d-q axis current signal and a current command, and output the set of d-q axis voltage signal to the first driving signal output circuit and the second driving signal output circuit according to the set of d-q axis current signal and the current command.

13. The motor driving circuit of claim 7, further configured to selectively output the six-step square wave driving signal or the space-vector driving signal to the inverter to drive the motor according to whether a motor temperature exceeds a first temperature threshold, whether an inverter power component temperature exceeds a second temperature threshold or whether a motor noise exceeds a noise threshold.

14. A motor driving circuit control method, comprising:
outputting a six-step square wave driving signal by a first driving signal output circuit;
outputting a space-vector driving signal by a second driving signal output circuit;
determining whether an operating power of a motor exceeds a power threshold by a motor driving circuit;

outputting the six-step square wave driving signal to an inverter to drive the motor by the motor driving circuit on the condition that the operating power exceeds the power threshold;

outputting the space-vector driving signal to the inverter to drive the motor by the motor driving circuit on the condition that the operating power does not exceed the power threshold;

outputting a phase shift command and an amplitude command according to a set of d-q axis voltage signal corresponding to the motor by a first voltage signal converter;

outputting the six-step square wave driving signal according to the phase shift command, the amplitude command and a motor electric angle corresponding to the motor by a first driving signal generator;

converting the set of d-q axis voltage signal into a three phase voltage signal according to the motor electric angle by a second voltage signal converter;

outputting the space-vector driving signal according to the three phase voltage signal by a second driving signal generator; and summing up the phase shift command and the motor electric angle to regard as an angle command and generating the six-step square wave driving signal according to the angle command by the first driving signal generator.

15. The motor driving circuit control method of claim 14, further comprising:

reducing PI control responses of a d-axis voltage signal by the first voltage signal converter, or perform low-pass filtering of the d-axis voltage signal and multiply the d-axis voltage signal by a proportion to regard as the phase shift command, or directly multiply the d-axis voltage signal by the proportion to regard as the phase shift command by the first voltage signal converter.

16. The motor driving circuit control method of claim 14, further comprising:

detecting whether a motor temperature exceeds a first temperature threshold;

detecting whether a inverter power component temperature exceeds a second temperature threshold;

detecting whether a motor noise exceeds a noise threshold;

outputting the six-step square wave driving signal to the inverter to drive the motor by the motor driving circuit on the condition that the motor temperature exceeds the first temperature threshold or the inverter power component temperature exceeds the second temperature threshold or the motor noise exceeds the noise threshold; and outputting the space-vector driving signal to the inverter to drive the motor by the motor driving circuit on the condition that the motor temperature does not exceed the first temperature threshold or the inverter power component temperature does not exceed the second temperature threshold or the motor noise does not exceed the noise threshold.

\* \* \* \* \*